(12) United States Patent
Vinogradov et al.

(10) Patent No.: US 7,445,154 B2
(45) Date of Patent: Nov. 4, 2008

(54) IMAGING READER WITH FOLDED IMAGE CAPTURE PATH AND DIRECT ILLUMINATION PATH

(75) Inventors: Igor Vinogradov, Bay Shore, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 115 days.

(21) Appl. No.: 11/496,305

(22) Filed: Jul. 31, 2006

(65) Prior Publication Data

US 2008/0023557 A1    Jan. 31, 2008

(51) Int. Cl.
*G06K 7/10* (2006.01)

(52) U.S. Cl. .............................. 235/462.43; 235/462.41; 235/462.42

(58) Field of Classification Search ................. 235/459, 235/462.14, 462.41, 462.42, 462.43, 462.44
See application file for complete search history.

(56) References Cited

U.S. PATENT DOCUMENTS

2002/0139853 A1* 10/2002 Tsikos et al. ........... 235/462.01
2006/0180670 A1*  8/2006 Acosta et al. .......... 235/462.31

* cited by examiner

*Primary Examiner*—Michael G. Lee
*Assistant Examiner*—Paultep Savusdiphol
(74) *Attorney, Agent, or Firm*—Kirschstein, et al.

(57) ABSTRACT

A target is illuminated with illumination light along a direct optical path that has no optical surface areas shared with a folded optical path along which light is captured by an imager in an imaging reader.

9 Claims, 2 Drawing Sheets

IMAGING READER WITH FOLDED IMAGE CAPTURE PATH AND DIRECT ILLUMINATION PATH

DESCRIPTION OF THE RELATED ART

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. Nos. 5,059,779; 5,124,539 and 5,200,599, a single, horizontal window is set flush with, and built into, a horizontal countertop of the workstation. Products to be purchased bear an identifying symbol and are typically slid or swiped across the horizontal window through which a multitude of scan lines in a scan pattern is projected in a generally upward direction. Each scan line is generated by sweeping a laser beam from a laser. When at least one of the scan lines sweeps over a symbol associated with a product, the symbol is processed and read.

Instead of, or in addition to, a horizontal slot scanner, it is known to provide a vertical slot scanner, which is typically a portable reader placed on the countertop such that its window is generally vertical and faces an operator at the workstation. The generally vertical window is oriented perpendicularly to the horizontal window, or is slightly rearwardly inclined. A scan pattern generator within the vertical slot scanner also sweeps a laser beam and projects a multitude of scan lines in a scan pattern in a generally outward direction through the vertical window toward the operator. The operator slides or swipes the products past either window from right to left, or from left to right, in a "swipe" mode. Alternatively, the operator merely presents the symbol on the product to the center of either window in a "presentation" mode. The choice depends on operator preference or on the layout of the workstation.

These point-of-transaction workstations have been long used for processing transactions involving products associated with one-dimensional symbols each having a row of bars and spaces spaced apart along one direction, and for processing two-dimensional symbols, such as Code 39, as well. Code 39 introduced the concept of vertically stacking a plurality of rows of bar and space patterns in a single symbol. The structure of Code 39 is described in U.S. Pat. No. 4,794,239. Another two-dimensional code structure for increasing the amount of data that can be represented or stored on a given amount of surface area is known as PDF417 and is described in U.S. Pat. No. 5,304,786.

Both one- and two-dimensional symbols can also be read by employing solid-state imagers, instead of moving a laser beam across the symbols in a scan pattern. For example, an image sensor device may be employed which has a one- or two-dimensional array of cells or photosensors which correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two- dimensional array of pixel information over a field of view.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

To acquire an image of a symbol under low ambient light or in a dark environment, an illuminator is employed to illuminate the symbol during image capture. The illuminator typically includes a plurality of light sources, such as light emitting diodes (LEDs), within the reader. The illumination light from each LED passes through the window of the reader en route to the symbol to be illuminated.

Although generally satisfactory for their intended purpose, the known imaging readers are too large for some applications where space is at a premium. Also, each LED acts as a pseudo-point source and illuminates some areas of the symbol more intensely than other areas, especially when the symbol is located close to the LEDs. Also, the illumination light can in some situations reflect off the window back to the image sensor device. This non-uniform illumination and illumination light reflections may compromise the capability of the reader to successfully decode the image. In addition, some readers omit the window and instead have an open presentation area at which the symbol is located for reading. Such a windowless design is advantageous, for example, in reducing the reflections, weight and cost of the reader; however, this permits dust, dirt and like contaminants to enter the reader. If such contaminants are present on an optical surface within the reader, then they tend to scatter light incident thereon. Any light from the illuminator that strikes any such contaminants tends to create undesirable zones of high light intensity and thus degrades the image captured by the imager. The illumination light highlights imperfections in the image caused by the contaminants.

SUMMARY OF THE INVENTION

One feature of the present invention resides, briefly stated, in a reader for, and a method of, electro-optically reading indicia, especially one- or two-dimensional symbols. The reader could be embodied as a stationary or portable point-of-transaction workstation having a windowless presentation area, or as a handheld reader having a windowless presentation area. In the case of the workstation, the symbol is swiped past, or presented to, the presentation area and, in the case of the handheld reader, the reader itself is moved and aimed at the symbol. In the preferred embodiment, the workstation is installed in a retail establishment, such as a supermarket.

A one- or two-dimensional, solid-state imager is mounted in the reader, and includes an array of image sensors operative for capturing light from a one- or two-dimensional symbol or target through the presentation area over a field of view during the reading. Preferably, the array is a CCD or a CMOS array. An illuminator is also mounted in the reader and illuminates the symbol during the reading with illumination light directed from an illumination light source through the presentation area. The illumination light source includes at least one light emitting diode (LED) and preferably a plurality of LEDs. The absence of a window at the presentation area avoids the possibility of illumination light reflections thereat.

The size of the reader is reduced by incorporating a fold mirror in the reader. The light from the symbol entering the presentation area strikes the fold mirror and reflects therefrom along a folded optical path to the imager. The folding mirror allows the front-to-back dimension of the reader to be reduced. This minimizes the size of the reader footprint, i.e., the area on a support surface that supports the reader, which is often important in crowded work environments such as a retail point-of-transaction workstation.

In accordance with this invention, the illumination LEDs are positioned deep within the reader so as to uniformly illuminate a symbol placed close to the reader at the presentation area and to avoid any non-uniform areas of high intensity light on the symbol. To maximize the distance between the LEDs and the symbol, a design approach might be to direct the illumination light at the fold mirror so that the illumination light also travels along a folded optical path. However, this is not desirable in a windowless reader because dust, dirt and like contaminants, which normally are prevented from entering the reader by a window, enter the reader and may land on the fold mirror. Such contaminants scatter light incident thereon. If the incident light is the illumination light, then the scattered illuminated light would be seen by the imager and significantly degrade image quality.

Thus, this invention proposes that the LEDs be positioned so that their illumination light travels through the presentation area to the symbol along a direct optical path that bypasses the fold mirror. The direct optical path of the illumination light and the folded optical path of the captured light do not share any optical surface areas and, more particularly, the illumination light is not incident on, or reflected by, the fold mirror.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
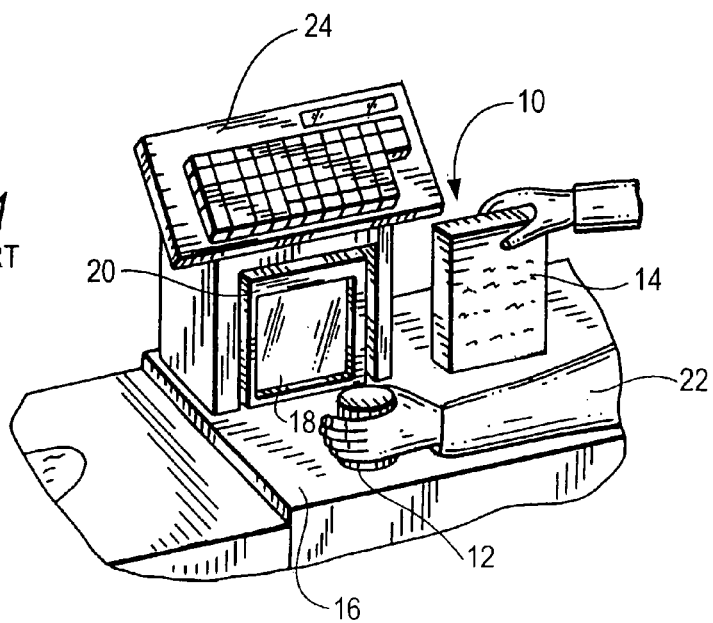
FIG. 1 is a perspective view of a point-of-transaction workstation operative for capturing light from symbol-bearing targets in accordance with the prior art.

Reference numeral 10 in FIG. 1 generally identifies a prior art workstation for processing transactions and specifically a checkout counter at a retail site at which products, such as a can 12 or a box 14, each bearing a target symbol, are processed for purchase. The counter includes a countertop 16 across which the products are slid at a swipe speed past, or are presented to, a vertical planar window 18 of a box-shaped vertical slot reader 20 mounted on the countertop 16. A checkout clerk or operator 22 is located at one side of the countertop, and the reader 20 is located at the opposite side. A cash/credit register 24 is located within easy reach of the operator.

Figure 2:
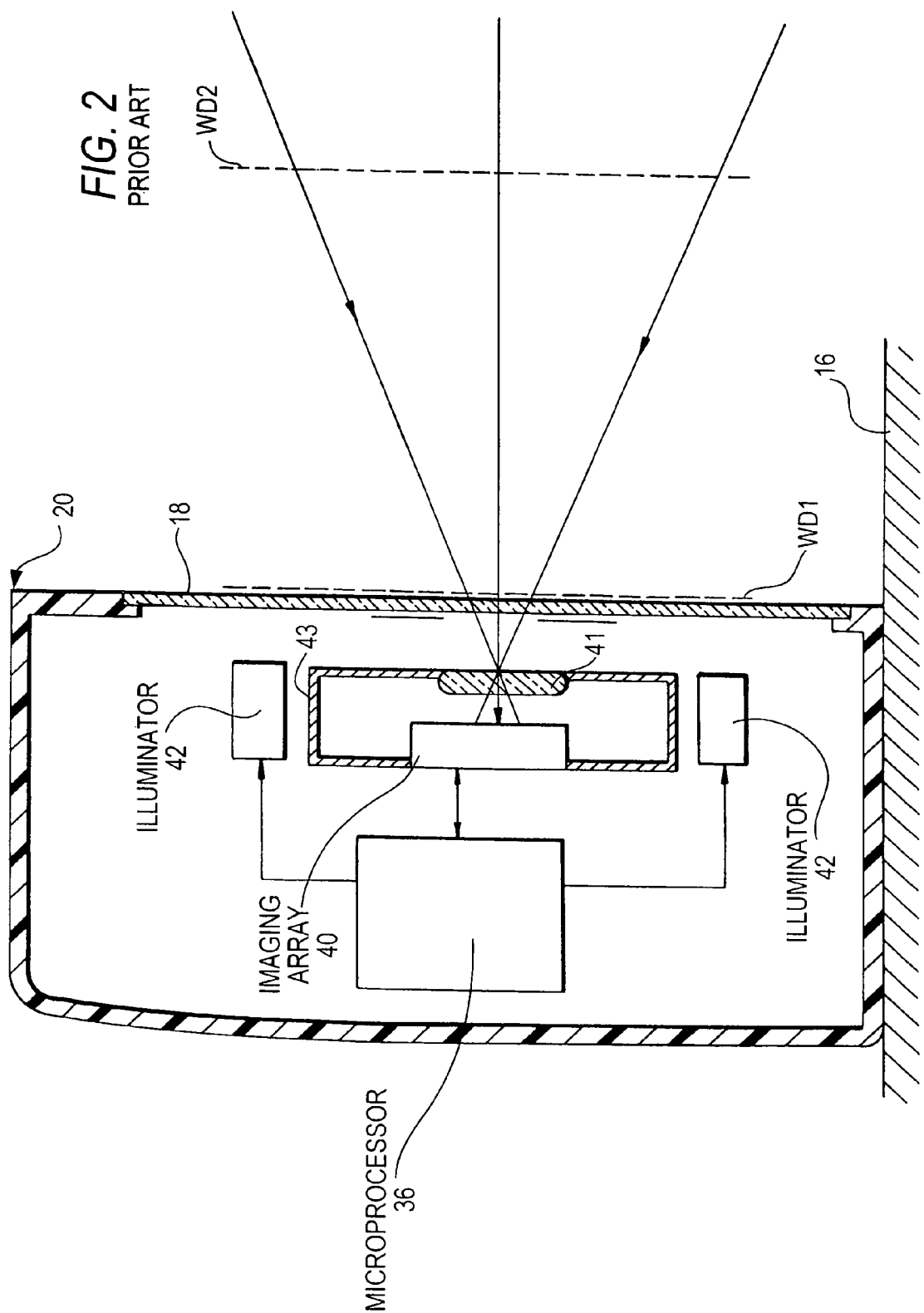
FIG. 2 is a block diagram of various components of the prior art workstation of FIG. 1.

As schematically shown in FIG. 2, an imager 40 and a focusing lens 41 are mounted in an enclosure 43 in either reader, such as the reader 20. The imager 40 is a solid-state device, for example, a CCD or a CMOS imager and has an array of addressable image sensors operative for capturing light through the window 18 from a target, for example, a one- or two-dimensional symbol, over a field of view and located in a working range of distances between a close-in working distance (WD1) and a far-out working distance (WD2). In a preferred embodiment, WD1 is about two inches from the imager array 40 and generally coincides with the window 18, and WD2 is about eight inches from the window 18. An illuminator is also mounted in the reader and preferably includes a plurality of light sources, e.g., light emitting diodes (LEDs) 42, arranged at opposite sides of the imager 40 to uniformly illuminate the target.

As also shown in FIG. 2, the imager 40 and the illuminator LEDs 42 are operatively connected to a controller or microprocessor 36 operative for controlling the operation of these components. Preferably, the microprocessor is the same as the one used for decoding light scattered from the indicia and for processing the captured target images.

In operation, the microprocessor 36 sends a command signal to pulse the illuminator LEDs 42 for a short time period, say 500 microseconds or less, and energizes the imager 40 to collect light from a target symbol only during said time period. A typical array needs about 33 milliseconds to read the entire target image and operates at a frame rate of about 30 frames per second. The array may have on the order of one million addressable image sensors.

Figure 3:
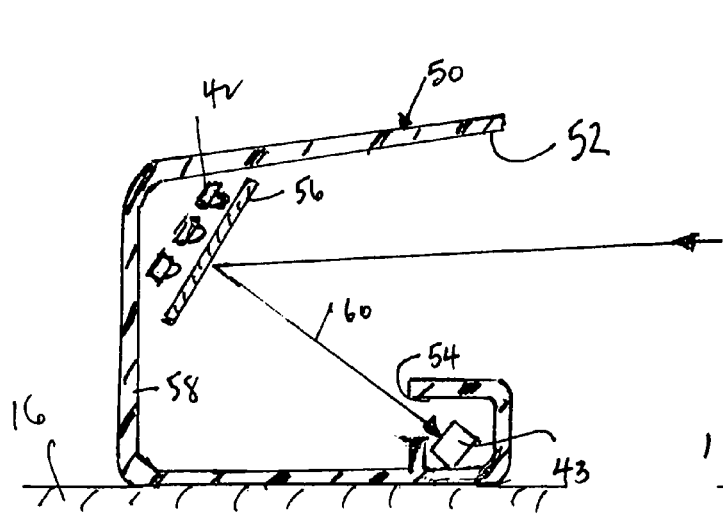
FIG. 3 is a side sectional view of an imaging reader in accordance with the invention.
Figure 4:
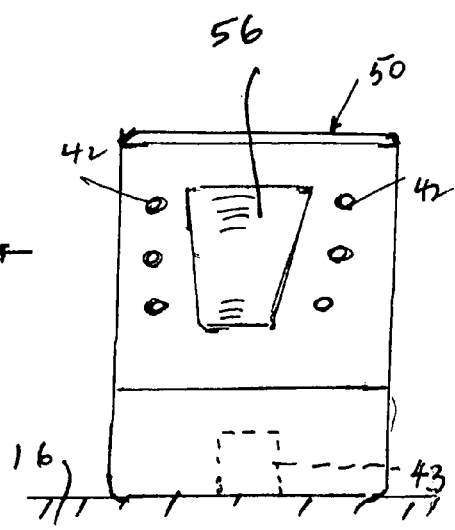
FIG. 4 is a front elevational view of the reader of FIG. 3.

FIG. 3 depicts a reader housing 50 in accordance with the invention in which the window has been eliminated. Instead, an open, windowless presentation area 52 is located at a front of the reader housing, and a symbol to be read is situated there. The enclosure 43 containing the array 40 and the lens 41 is situated within the housing within a compartment 54 at the front of the housing. The array faces a fold mirror 56 situated adjacent a rear wall 58 of the housing. The illuminator LEDs 42 are positioned adjacent the rear wall 58 at opposite sides of the fold mirror 56, as best seen in FIG. 4.

The size of the reader housing is reduced by incorporating the fold mirror 56 in the housing. Light from a symbol situated at the presentation area 52 strikes the fold mirror 56 and reflects therefrom along a folded optical path 60 to the array in the enclosure 43. Tile fold mirror 56 allows the front-to-back dimension of the reader to be reduced. This minimizes the size of the reader footprint, i.e., the area on a support surface that supports the reader housing, which is often important in crowded work environments such as a retail point-of-transaction workstation.

In accordance with this invention, the illumination LEDs 42 are positioned deep within the reader adjacent the rear wall 58 so as to minimize non-uniform light distribution on the symbol, especially when the symbol is at working distance WD1 and is in contact with the housing at the presentation area. As previously discussed, each LED 42 is a pseudo-point source that tends to create such high non-uniform intensity areas of light variation on the symbol, especially when the symbol is close to the LEDs.

As previously mentioned, dust, dirt and like contaminants, which normally are prevented from entering the reader by a window, enter the windowless reader housing 50 via the open presentation area 52, and such contaminants may land on the fold mirror 56. Such contaminants scatter light incident thereon. If the illumination light struck the contaminants on the fold mirror, then the scattered illumination light would be seen by the array and significantly degrade image quality. Hence, despite the fact that it is desirable to position the LEDs 42 as far as possible away from the symbol, this cannot be done by using the fold mirror 56.

Thus, the LEDs 42 are positioned so that their illumination light travels through the presentation area to the symbol along a direct optical path that bypasses the fold mirror 56. The direct optical path of the illumination light and the folded optical path 60 of the captured light do not share any optical surface areas and, more particularly, the illumination light is not incident on, or reflected by, the fold mirror 56.

It will be understood that each of the elements described above, or two or more together, also may find a useful application in other types of constructions differing from the types described above. Thus, readers having different configurations can be used.

While the invention has been illustrated and described as an illuminator for illuminating a symbol along a direct optical path which is decoupled from, and has no shared optical areas with, a folded optical path along which light is captured by an imager in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading indicia, comprising:
    a housing having a rear wall and a front wall through which contaminants pass through an open, windowless presentation area;
    a fold mirror in the housing adjacent the rear wall;
    a solid-state imager in the housing adjacent the front wall and including an array of image sensors for capturing light passing along a folded optical path through the open presentation area from the indicia over a field of view and reflected off the fold mirror; and
    an illuminator in the housing adjacent the rear wall for illuminating the indicia during reading with illumination light directed from a plurality of light emitting diodes (LEDs) at opposite sides of the fold mirror through the open presentation area to the indicia at the open presentation area along a direct optical path that bypasses the fold mirror to resist reading degradation by the contaminants on the fold mirror.

2. The reader of claim 1, wherein the fold mirror is a planar reflector.

3. The reader of claim 1, wherein the LEDs are situated adjacent the rear wall of the housing.

4. The reader of claim 1, wherein the housing has a base for supporting the housing on a support surface for workstation operation.

5. A method of electro-optically reading indicia, comprising the steps of:
    spacing a front wall of a housing away from a rear wall thereof;
    forming through the front wall an open, windowless presentation area through which contaminants pass into the housing;
    capturing light passing through the open presentation area from the indicia over a field of view during reading by an array of image sensors of a solid-state imager adjacent the front wall;
    directing the captured light along a folded optical path to the imager by reflection from a fold mirror adjacent the rear wall; and
    illuminating the indicia during reading with illumination light directed from a plurality of light emitting diodes (LEDs) at opposite sides of the fold mirror through the open presentation area to the indicia along a direct optical path that bypasses the fold mirror to resist reading degradation by the contaminants on the fold mirror.

6. The method of claim 5, and forming the fold mirror as a planar reflector.

7. The method of claim 5, and situating the LEDs adjacent the rear wall of the housing.

8. The method of claim 5, and supporting the housing on a support surface for workstation operation.

9. The method of claim 5, and decoupling the direct optical path and the folded optical path so that they share no optical surface areas.

* * * * *